No. 645,996. Patented Mar. 27, 1900.
A. BUCHEY.
HAY STACKER.
(Application filed Oct. 28, 1899.)
(No Model.) 2 Sheets—Sheet 1.
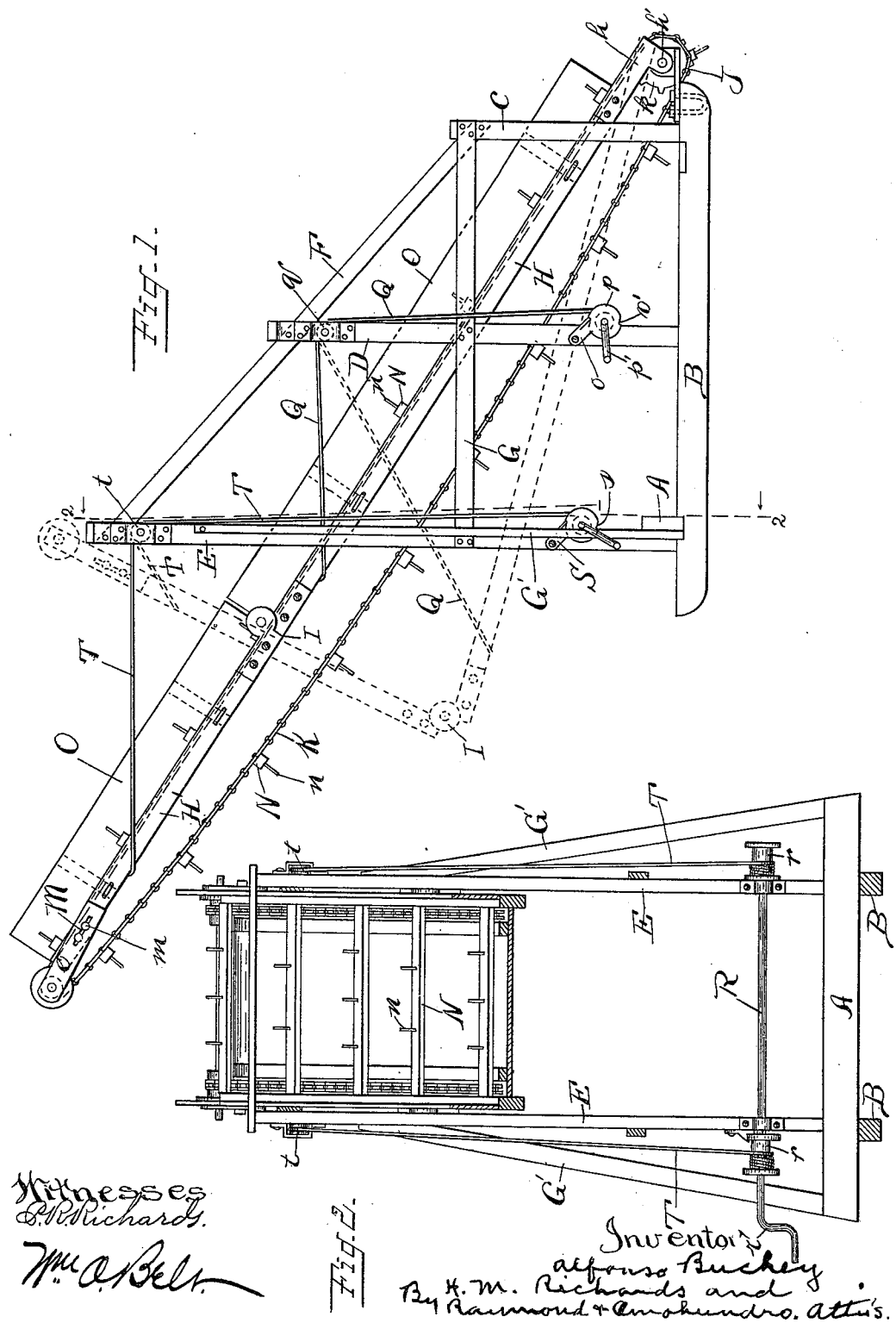

No. 645,996. Patented Mar. 27, 1900.
A. BUCHEY.
HAY STACKER.
(Application filed Oct. 28, 1899.)
(No Model.) 2 Sheets—Sheet 2.
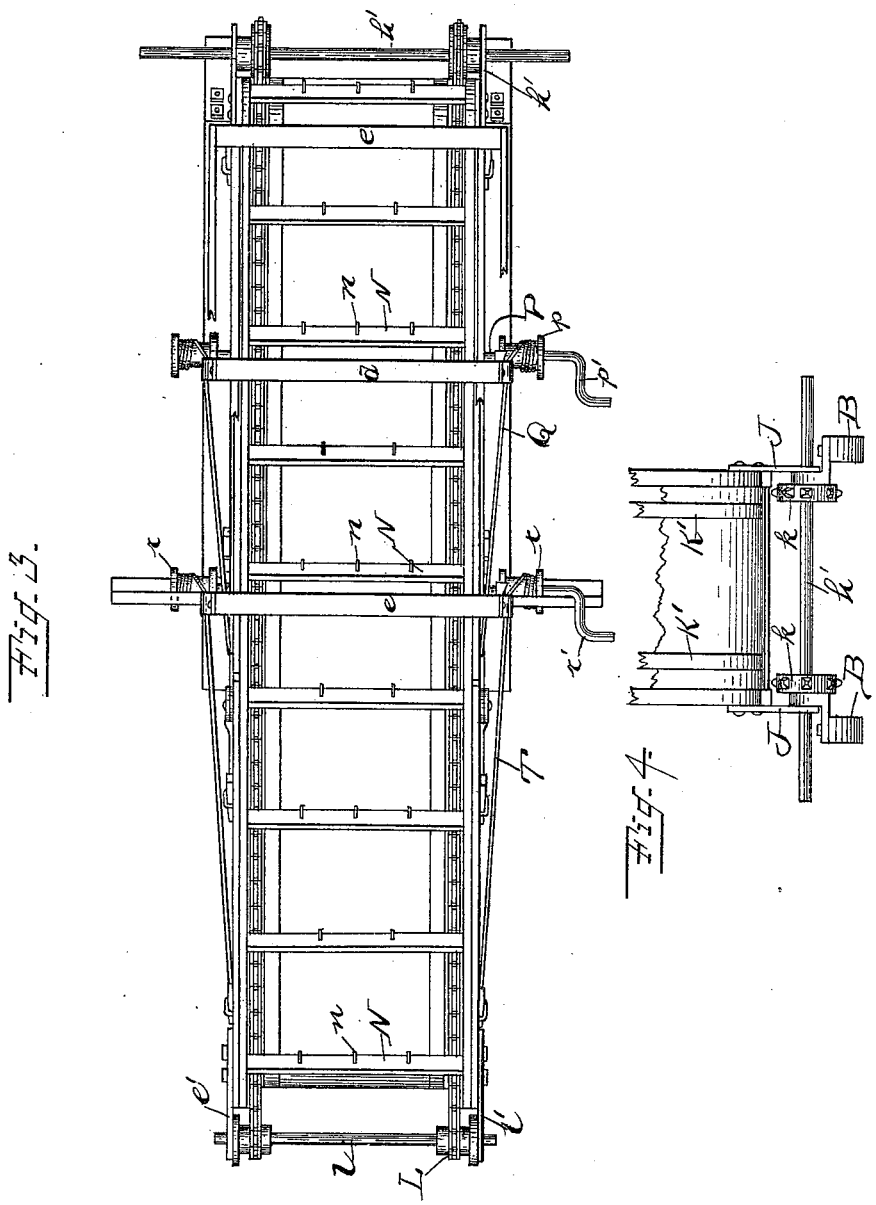
Witnesses:
P. R. Richards.
Wm O. Belt.
Inventor:
Alfonso Buchey,
By H. M. Richards and
Raymond & Omahundro, Attys.
THE NORRIS PETERS CO., PHOTO-LITHO., WASHINGTON, D. C.

UNITED STATES PATENT OFFICE.

ALFONSO BUCHEY, OF MAPLE HILL, KANSAS, ASSIGNOR OF TWO-THIRDS TO WARNER & POTTER, OF TOPEKA, KANSAS.

HAY-STACKER.

SPECIFICATION forming part of Letters Patent No. 645,996, dated March 27, 1900.

Application filed October 28, 1899. Serial No. 735,049. (No model.)

*To all whom it may concern:*

Be it known that I, ALFONSO BUCHEY, a citizen of the United States, residing at Maple Hill, in the county of Wabaunsee and State of Kansas, have invented certain new and useful Improvements in Hay-Stackers, of which the following is a specification.

My invention relates to certain new and useful improvements in stackers, and it is particularly useful and adapted for stacking hay and straw and for loading the same upon wagons or into lofts and other places where it is necessary to lift the hay or straw to a height.

The primary object of my invention is to provide a simple and substantial apparatus for stacking hay and straw which can be easily manipulated and readily moved from place to place as occasion demands and which is capable of adjustment to adapt it to various conditions.

Another object of the invention is to provide a hay or straw stacker with a folding elevator, whereby the apparatus can be arranged in a compact form, so that it may be moved from place to place in a field to better advantage.

A further object of the invention is to provide a simple construction and arrangement of parts which is light in weight and can be manufactured inexpensively and which is adapted to pick up the hay or straw directly from the ground and carry it to the discharge-place.

With these and other ends in view my invention consists in the peculiar construction and arrangement of parts hereinafter described, and illustrated in the accompanying drawings, in which—

Figure 1 is a side elevation showing an embodiment of my improved stacker, the elevator being illustrated in full lines extended to the full length and in dotted lines in its folded position. Fig. 2 is a sectional view on the line 2 2 of Fig. 1. Fig. 3 is a top plan view. Fig. 4 is a detail view illustrating the use of belts instead of chains for the elevator.

Referring to the drawings, in which like letters of reference denote corresponding parts in all of the figures, my invention comprises a suitable frame, which can be made in a variety of different ways as to its details, but in general construction consists of base-bars A, mounted on runners B or wheels, as desired, and uprights C D E of increasing height, supported on the base-bars and runners and suitably connected by the braces F G G'. The two sides of the frame are connected at the top by cross-pieces *c d e*, and other bracing and strengthening pieces may be employed, if desired. In the drawings I have shown the stacker mounted on runners B, which is a convenient method of mounting the same; but it will be understood, of course, that any suitable carrying-wheels may be used in place of or in connection with the runners, if desired. The uprights or standards C D E vary in height to provide for raising the elevator or carrier, and more of said uprights may be employed, if desired.

The elevator consists of a frame H, divided into two parts and connected by a rule-joint at I, so that the outer part H' can be folded in the manner shown in dotted lines in Fig. 1. The lower end of the elevator-frame is provided with the side brackets *h*, having openings therein to receive the shaft *h'*, by means of which the frame is pivotally mounted in the brackets J, secured to the main frame.

The elevator is provided with an endless carrier, which may be formed by the use of chains or belts, as desired, chains being shown in Fig. 1 and belts in Fig. 4. These endless chains K or belts K' run over sprocket-wheels or belt-wheels *k* on the shaft *h'* and on sprocket-wheels or belt-wheels L, carried by the shaft *l*, journaled in brackets *l'* on the outer end of the carrier, these brackets *l'* being provided with slots M, through which the fastening-bolts *m* pass, by means of which they are secured to the elevator-frame and whereby the said brackets can be adjusted longitudinally on the frame to tighten or loosen the endless chains or belts, as desired. The endless chains or belts are provided with cross-pieces N at suitable intervals, having prongs or tines *n* secured thereto and projecting outwardly therefrom, and the elevator is provided with removable side boards O, which are arranged and secured in place in any suitable manner to prevent the hay or straw from falling from the sides of the elevator and likewise to prevent the hay or straw from being blown from the elevator by wind.

In order to raise and lower the elevator, I provide a windlass, mounted on the uprights D and comprising a crank-shaft P, having on the ends thereof, extending beyond said uprights, suitable spools $p$. On one end of the shaft I provide a crank $p'$, and I also provide a pawl $o$ on one of the uprights D, which is adapted to engage one of a series of notches $o'$ in the rim of one spool $p$ to constitute a locking device to hold the elevator in its adjusted position. Ropes Q are connected with the spools $p$ and pass up over pulleys $q'$, journaled in suitable bearings in the upper ends of the uprights D, and have their ends connected to the elevator-frame H, preferably just below the rule-joint therein. By this construction it will be readily understood that the elevator can be raised and lowered to the proper position, so that the carrier will discharge the hay or straw properly on the stack or elsewhere, it being simply necessary to turn the crank $p'$ to raise or lower the elevator.

In order to fold the outer end H' of the elevator, I provide another windlass, consisting of a shaft R, journaled in bearings on the upright E and provided with spools $r$ on their ends, arranged outside of the said uprights. I also provide a crank $r'$ on one end of the shaft and a pivot-pawl S on one of the uprights, which is adapted to engage one of a series of notches $s$ on the rim of one spool $r$, thereby constituting a locking device to hold the parts in their adjusted position. Ropes T are secured to the spools $r$ and pass up and over pulleys $t$, journaled in suitable bearings at the upper ends of the uprights E, and are connected to the part H' of the elevator-frame near its outer end. By means of these ropes and the windlasses the outer part of the elevator-frame H' can be raised and folded against the main frame of the stacker in the manner shown in dotted lines in Fig. 1, the ropes Q being allowed to pay out sufficiently to permit the elevator-frame to break at the rule-joint I and drop down into what I have termed the "folded" position of the uprights. By folding the elevator in this manner the apparatus is brought to a compact form, so that it can be more easily and readily transferred from place to place.

A stacker constructed in the manner hereinbefore described and as shown in the embodiment illustrated in the drawings provides a simple apparatus which is adapted to perform all of the functions and accomplish all of the desired results of an apparatus for stacking hay, straw, or other similar material. The devices for operating the stacker are very simple and can be easily manipulated without the exercise of any particular skill. It will be observed that the apparatus is so constructed that the carrier will pick up the hay or straw directly from the ground in its operation over the elevator-frame, and for this reason it will only be necessary to drag the hay or straw up to the carrier and it will pick the same up without any assistance, or, if desired, a man may be stationed at the bottom of the elevator to throw the hay or straw upon the carrier.

To actuate the endless carrier, any suitable power may be applied to the shaft $h'$, and I have contemplated using a one-horse power and a belt connection between the same and said shaft, but any power may be employed and any method of transmitting same to the stacker may be used without departing from the spirit of my invention.

Having thus fully described my invention, what I claim, and desire to secure by Letters Patent, is—

1. In a stacker, the combination with a main frame, comprising uprights secured at their lower ends to horizontal supports, of brackets secured to said supports; an elevator-frame pivotally secured at its lower end to said brackets; and comprising hinged sections; means for raising the lower section of the elevator; and independent means for raising the adjacent section as the lower section is lowered to effect the folding of the elevator-frame.

2. In a stacker, the combination with a main frame, comprising uprights secured to parallel runners; of brackets projecting from said runners; an elevator-frame consisting of hinged sections and provided with a transverse shaft pivotally connecting the brackets on the runners with those on the elevator-frame; an endless carrier passing over said shaft in close proximity to the ground; means for raising the lower pivoted section of the elevator-frame, and independent means for raising the adjacent section to fold the elevator-frame.

ALFONSO ✕ BUCHEY.
his mark

Witness to mark:
  G. S. JONES.
Witnesses:
  REES NANNAH,
  GEO. S. OLIVER.